Feb. 1, 1927.

G. E. ROHMER 1,616,233

PROCESS FOR OXIDIZING NONFERROUS METALS

Filed Sept. 30, 1925   3 Sheets-Sheet 1

INVENTOR
Gabriel E. Rohmer
BY
Kiddle and Margesen
ATTORNEYS.

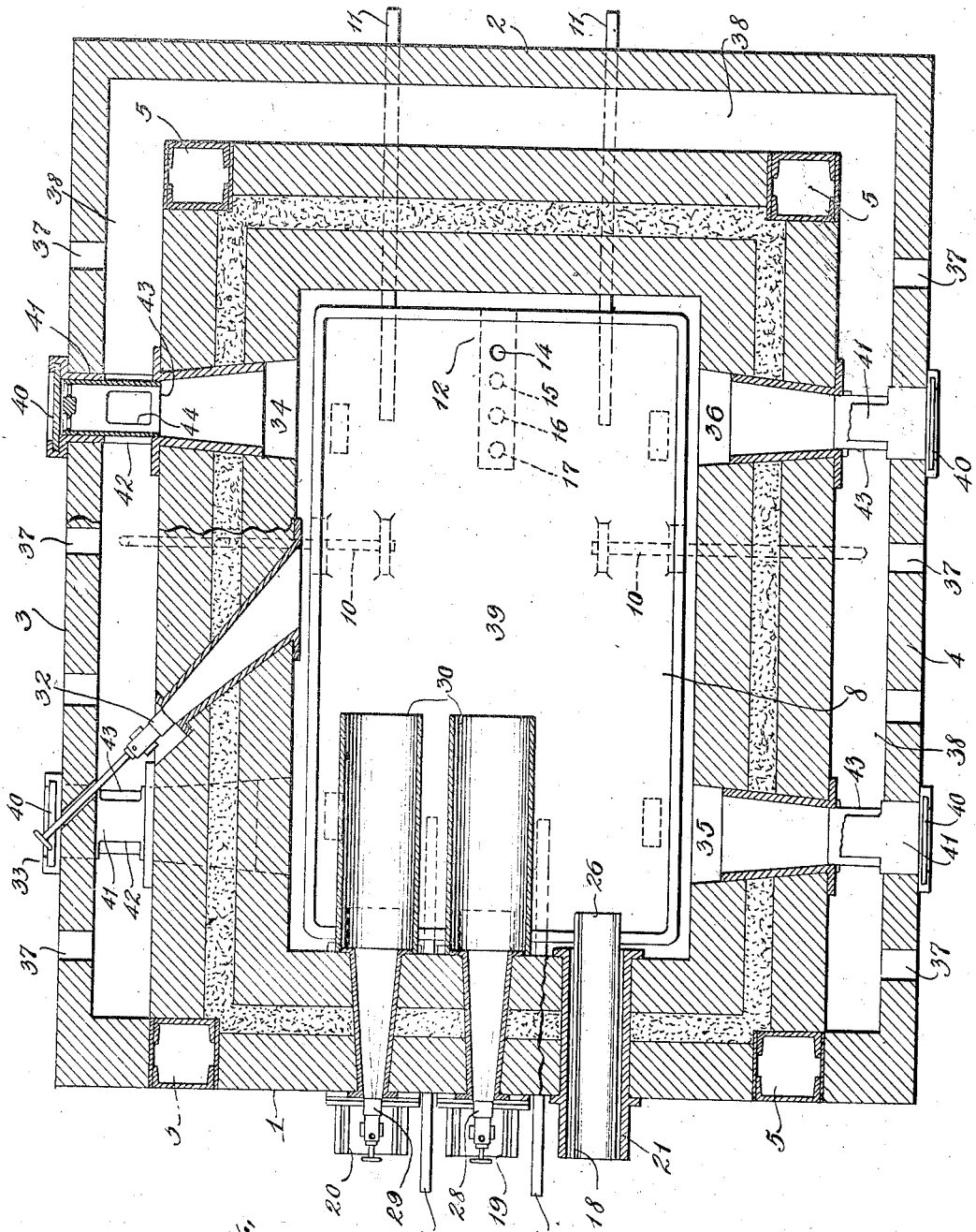

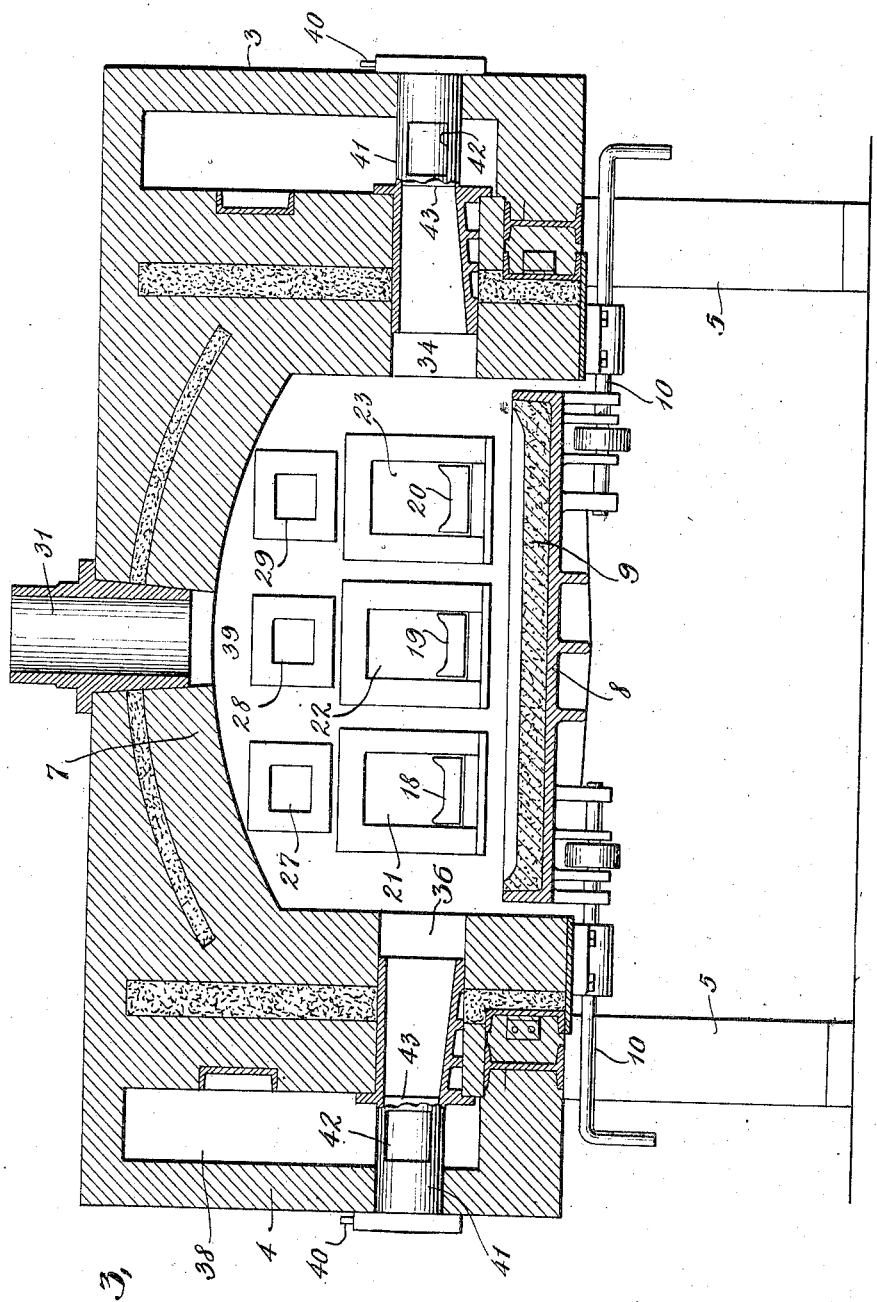

Patented Feb. 1, 1927.

1,616,233

UNITED STATES PATENT OFFICE.

GABRIEL E. ROHMER, OF NEW YORK, N. Y., ASSIGNOR TO ANDREWS LEAD COMPANY, INC., OF LONG ISLAND CITY, NEW YORK, A CORPORATION OF NEW YORK.

PROCESS FOR OXIDIZING NONFERROUS METALS.

Application filed September 30, 1925. Serial No. 59,464.

My invention relates to an improved method for effecting the oxidation of certain elements or metals of a non-ferrous nature, such as lead, zinc, etc., the oxides of which are used in the manufacture of paints, rubber, enamels, etc., and in the refining of certain products such as oil, petroleum and similar products.

One of the objects of my invention is the provision of a method for the purpose above indicated whereby I may effect the oxidation of elements or metals such as those mentioned much more thoroughly, more efficiently and in far less time than is capable with the methods and apparatus now employed in this art.

I am aware of course that various types of furnaces and a number of different methods are now employed in the oxidation of non-ferrous metals, but in all such methods and in all such furnaces so far as I am aware to the contrary the lead or other metal being treated is subjected to the action of heat and the reducing effect of oxygen while in a relatively large thick mass. This necessitates the use of agitators or breakers of some sort for breaking up or agitating the metal mass while the same is being subjected to oxidation, resulting obviously in efficiency losses, as well as unnecessary expense by way of necessary equipment, with the attendant risk of improper oxidation or reduction of the metal being treated.

A further object of my invention, therefore, is the provision of an improved method whereby the losses above referred to may be eliminated, my method not only very materially reducing the time within which a given amount of material may be treated, but eliminating the use of the stirrers or agitators above referred to, while at the same time insuring the thorough oxidation of the mass being treated.

A still further object of my invention is the provision of a method adapted for the oxidizing of non-ferrous metals such as lead, zinc, etc., whereby the metal is subjected to the action of heat and oxygen while spread out in a thin flat sheet or film, provided by gravity flow over a heated hearth, the temperatures employed in practicing my method and hereinafter referred to being sufficient to transform the metal into an oxide and to fuse the oxide, the relatively thin sheet or film in which the material is treated eliminating entirely the necessity of employing stirrers or agitators of any kind as now known. This method permits of a steady continuous uninterrupted oxidation of the material being treated and a constant continuous discharge. In other words by my improved method I eliminate entirely the type of process now employed wherein the lead or other metal is treated in batches, and can feed material constantly or practically so to the furnace and to the same degree effect a constant continuous discharge therefrom.

In general my improved method provides for feeding the lead in pig or other form to a furnace so arranged that the metal as it liquefies drips or falls upon an inclined heated hearth over which it spreads in the form of a thin film, while constantly flowing toward the discharge end of the hearth, the metal of course while in this form being subjected to the oxidizing action of heated oxygen, the metal discharging automatically from the furnace.

In the drawings accompanying the present application, I have shown one form of furnace suitable for the practice of my improved process.

Fig. 2 is a plan view of the same; and

Fig. 3 is a section taken substantially on the line 3—3 of Fig. 1.

Figure 1:
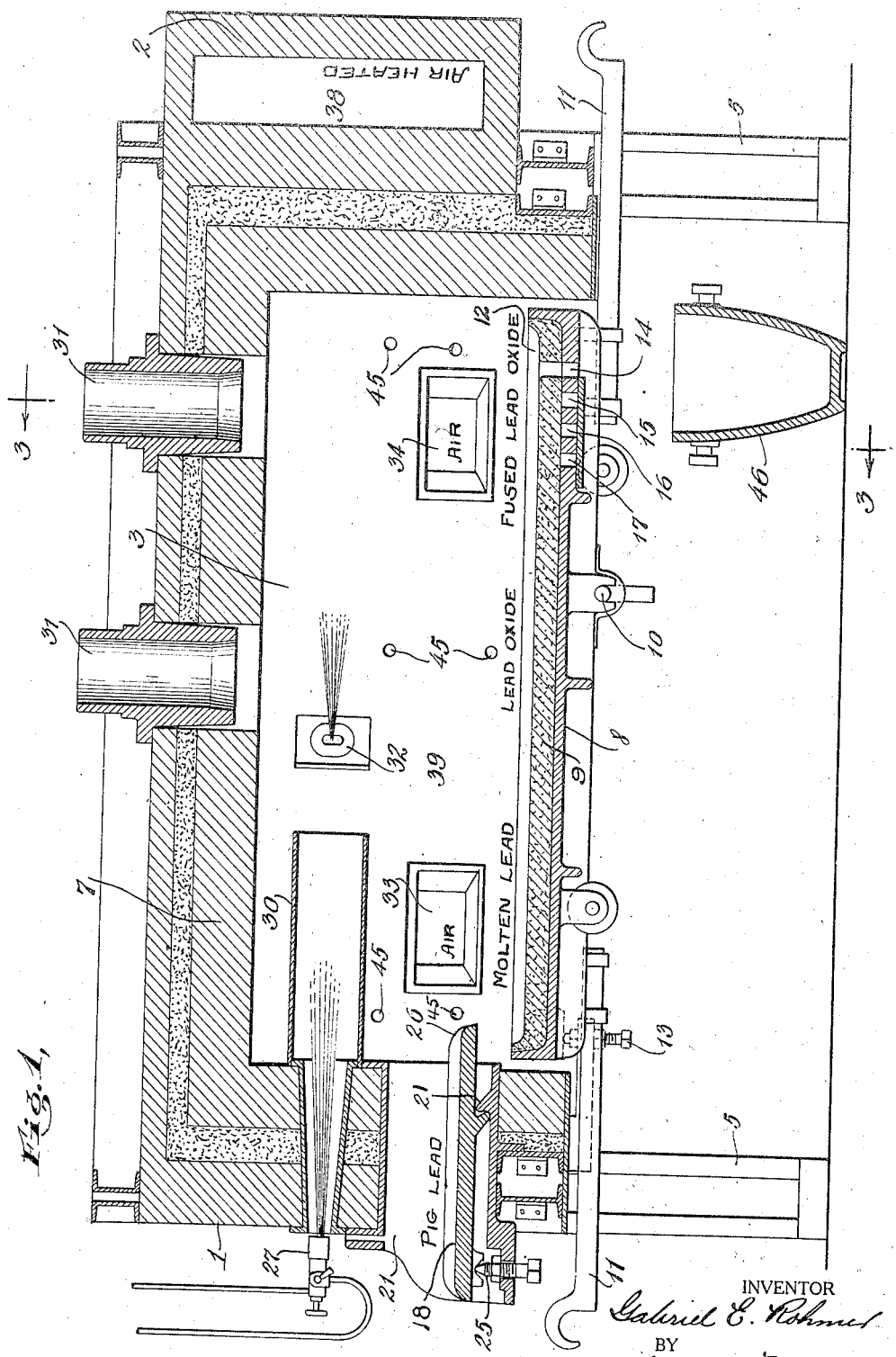
Fig. 1 shows an embodiment of one form of my improved furnace in sectional elevation.

Referring to the drawings in detail, the furnace comprises the four walls 1, 2, 3 and 4, supported on posts 5 and crowned with arch 7.

Pivoted within the furnace in the bottom thereof is a tiltable hearth 8, faced with suitable refractory material 9. This hearth is mounted on removable pivots 10, adapted to be withdrawn readily for removal of the hearth when necessary, the hearth being provided with handles 11, by which a tackle may be attached thereto for supporting the hearth after removal of the pivots.

The wall 1 of the furnace constitutes the feed end thereof, and the discharge end 12 of the hearth is adapted to be depressed so as to incline the hearth from the feed end toward the discharge end, the means for so depressing the hearth comprising adjusting bolt 13, accessible from beneath the furnace and bearing against the underside of the hearth. By adjusting this bolt the hearth may be set at the desired angle of inclination. Adjacent the discharge end of the hearth I provide a plurality of discharge openings 14, 15, 16 and 17, in staggered relation to each other, these openings being so arranged as to permit of variation in the characteristics of the material being treated. In other words, leads, for example, of different degrees of purity require different periods of treatment, and by providing the openings above referred to the length of time, i. e., the distance of travel may be varied.

Across the feed end of the furnace are disposed feed shelves, three having been illustrated, designated 18, 19 and 20, respectively, these shelves lying in openings 21, 22 and 23, respectively, provided for that purpose in the front wall 1 of the furnace.

Each shelf is pivoted as indicated at 24, and may be tilted to the desired angle by adjusting bolt 25. These shelves are provided for the reception of the material being treated, and which in the case of lead for instance will be in "pig" form. The inner end 26 of each shelf extends into the furnace sufficiently to overlie the feed end of the hearth heretofore referred to, as indicated in Fig. 1 for example. In operation the lead, or other element being treated, as it melts, drips or falls upon the hearth as will be pointed out hereinafter.

Immediately above the feed shelves 18, 19 and 20, I provide burners, 27, 28 and 29, adapted for the burning of oil or gas or other suitable fuel, by which the furnace is heated, and each burner may be provided if desired with a tube at its inner end, which I have shown at 30, for effecting heating of the furnace by radiation. The products of combustion escape from the furnace through vents 31.

In addition to the burners already referred to I provide the side walls 3 and 4 of the furnace with additional burners 32, of the same type for example as the burners 27, 28 and 29.

Air is admitted to the furnace through a series of openings designated 33 and 34 in the side wall 3 and 35 and 36 in the side wall 4, while additional air is supplied through side wall openings 37.

The end wall 2 and side walls 3 and 4 of the furnace are provided with air duct 38, by which the air entering the treating chamber 39 of the furnace may be preheated. If desired, however, air may be admitted directly to the treating chamber through the inlets 33, 34, 35 and 36. Each of these inlets is provided with a controlling plate or damper 40, by which the amount of air admitted may be regulated at will. In addition each of these inlets is provided with a sleeve, 41, provided with inlets 42.

Within each sleeve is another sleeve 43 also provided with openings 44. By rotating either the outer sleeve 41 or the inner sleeve 43 the air passing into the furnace through the openings 33, 34, 35 and 36 may be shut off entirely, whereby the air admitted through inlets 37 may be preheated in the duct 38 to any degree desired and then admitted by rotation of either of the sleeves 41 or 43 to the chamber 39. The plates 40 in the meantime may be entirely closed. This arrangement therefore provides for accurate control not only of the amount of air being taken into the furnace chamber 39, but the temperature as well, permitting furthermore of control of the temperature of the furnace chamber.

In practice the lead or other metal to be treated is charged in "pig" form upon the shelves 18, 19 and 20. As the furnace is brought to the desired temperature by the burners, this temperature varying from 650° C. to 1200° C. depending upon the purity of the metal being treated, this being controlled by the thermo-couples 45 of ordinary construction and merely illustrated herein diagrammatically, the metal drips upon the hearth 8, spreads out in a thin layer or film thereon, gradually flowing along the hearth by gravity in the form of a flowing sheet until it discharges through the discharge openings in the hearth to a vessel 46 beneath the same in the form of liquefied or fused litharge. Thereafter it may be dumped from the receptacle 46 on a cooling platform of any usual construction.

It will be seen from the foregoing that I have provided an improved method for treating metals such as lead, zinc, etc., whereby the entire mass of metal on the furnace wall is spontaneously transformed into an oxide and whereby process may be carried on continuously as distinguished from the methods now employed wherein batch operation is practiced. It will be understood also that the inclination of the hearth, that is to say, the length of time consumed in the passage of the metal under treatment from the feed to point of discharge may be varied to suit conditions with respect to the character of the metal being treated.

While I have described a specific embodiment of a furnace capable of use in the practice of my improved method, it is to be understood that other types of furnace may be employed and that changes may be made in the details of the furnace described within the purview of my invention.

What I claim is:—

1. The method of oxidizing a non-ferrous metal which method consists in passing the same through and out from the heated chamber of a furnace containing oxygen while the metal is in the form of a thin film or flowing sheet.

2. The method of oxidizing a non-ferrous metal which method consists in flowing the metal by gravity and in the form of a thin relatively wide spread flowing sheet through and out from the heated chamber of a furnace containing oxygen.

3. The method of oxidizing a non-ferrous metal which method consists in flowing a thin relative wide spread body of molten metal through and out from the heating chamber of a furnace while admitting oxygen to said chamber, and while the chamber is heated to the fusing temperature of the metal therein treated.

4. The method of oxidizing a non-ferrous metal, which method consists in advancing the same continuously in the form of a thin, widely spread flowing sheet body while subjecting the metal to the action of heat and oxygen.

5. The method of oxidizing a non-ferrous metal which method consists in flowing the metal in the form of a thin, widely spread body through a zone containing oxygen and heated to the fusing temperature of the metal being treated while continuously renewing the supply of metal to said zone and discharging the resultant product from said zone.

6. The method of oxidizing a non-ferrous metal, which method consists in heating the metal and in spontaneously transforming the entire mass of said metal on the furnace wall into an oxide.

7. The method of oxidizing a non-ferrous metal, which method consists in heating the metal and in spontaneously transforming said metal on the furnace wall into an oxide in the presence of oxygen.

8. The method of oxidizing a non-ferrous metal which method consists in fusing said metal, oxidizing it and passing said oxide through and out from the heated chamber of a furnace containing oxygen while the molten metal is in the form of a thin flowing sheet.

9. The method of oxidizing a non-ferrous metal, which method consists in fusing said metal, oxidizing it and passing said oxide by gravity through the heated chamber of a furnace containing oxygen while the metal is in the form of a thin, relatively wide spread flowing sheet.

10. The method of oxidizing a non-ferrous metal, which method consists in flowing a molten thin, relatively wide spread body of metal across the heating chamber hearth of a furnace while admitting oxygen to said chamber and while the chamber is heated to a temperature which will transform said metal into an oxide, and in fusing said oxide.

11. The method of oxidizing a non-ferrous metal, which method consists in flowing the molten metal by gravity in the form of a thin and relatively wide spread flowing sheet through the heated chamber of a furnace containing oxygen, in transforming said metal into an oxide, and in fusing said oxide during gravity flow.

12. The method of oxidizing a non-ferrous metal, which method consists in advancing the same continuously in the form of a molten, thin, widely spread flowing sheet while subjecting the metal to the action of heat and oxygen.

13. The method of oxidizing a non-ferrous metal, which method consists in advancing the same continuously in the form of a molten, thin, widely spread flowing sheet, in transforming said metal in an oxide, and in fusing said oxide by the action of heat and oxygen.

14. The method of oxidizing a non-ferrous metal, which method consists in flowing the metal in the form of a molten, thin, widely spread flowing sheet through a zone containing oxygen and heated to ranges of temperature which will cause the mass of said metal to oxidize throughout, and subsequently to fuse while the molten widely spread body flow continues its gravity run, and in discharging said molten widely spread body flow fused oxide away from said zone.

15. The method of oxidizing a non-ferrous metal, which method consists in supplying masses of cold metal at the inlet end of the heating chamber of a furnace, in slowly melting said cold masses of metal to induce a continuous thin, widely spread body flow through a zone in said furnace containing oxygen and ranges of temperature sufficient to cause said continuous thin and widely spread flowing metal sheet to be oxidized throughout, in fusing said oxidized metal and in discharging said fused oxidized metal flow at the outlet end of said furnace.

This specification signed this 22d day of September, 1925.

GABRIEL E. ROHMER.